United States Patent [19]

Duncan et al.

[11] Patent Number: 5,786,975
[45] Date of Patent: Jul. 28, 1998

[54] ELECTRONIC SWITCHING CIRCUITS

[75] Inventors: Peter H. Duncan; Glenn R. Randall. both of Bristol, Great Britain

[73] Assignee: British Aerospace PLC, Bristol, Great Britain

[21] Appl. No.: 38,340

[22] Filed: Mar. 19, 1993

[30] Foreign Application Priority Data

Mar. 21, 1992 [GB] United Kingdom ............... 9206194

[51] Int. Cl.$^6$ ........................................... H02H 3/22
[52] U.S. Cl. ................. 361/111; 250/505.1; 376/254
[58] Field of Search ................. 250/505.1; 361/111, 361/110; 376/254, 255; 976/DIG. 426

[56] References Cited

U.S. PATENT DOCUMENTS

| | | |
|---|---|---|
| 3,968,421 | 7/1976 | Marcade. |
| 3,973,224 | 8/1976 | Gaule et al. ............... 333/12 |
| 4,245,270 | 1/1981 | Busby ............... 361/111 |
| 4,687,622 | 8/1987 | Longden ............... 376/255 X |
| 5,287,241 | 2/1994 | Puar ............... 361/111 X |
| 5,333,094 | 7/1994 | Fucito ............... 361/111 X |

FOREIGN PATENT DOCUMENTS

| | | | |
|---|---|---|---|
| 2544482 | 4/1977 | Germany | 361/111 |
| 2711315 | 9/1978 | Germany | 361/111 |
| 1596444 | 8/1981 | United Kingdom . | |

OTHER PUBLICATIONS

Larry Longden & Anthony Trippe, IRT Corp., 'Hybrid Detector Protects Circuits From Radiation', EDN, Aug. 22, 1985, pp. 133–139.

*Primary Examiner*—David C. Cain
*Attorney, Agent, or Firm*—Cushman Darby & Cushman IP Group of Pillsbury Madison & Sutro LLP

[57] ABSTRACT

A switching circuit especially suitable for protecting electronic components such as integrated circuits (2) from the harmful effects of ionizing radiation. The circuit comprises two switches for isolating the component (2) from its power supply, the switches conveniently being NPN transistors (TR1, TR2) and being connected either side of a decoupling capacitor (3) associated with a component (2). Because the capacitor (3) is allowed to retain its charge during power-off, no time is lost in recharging it once the power supply has been resumed.

27 Claims, 3 Drawing Sheets

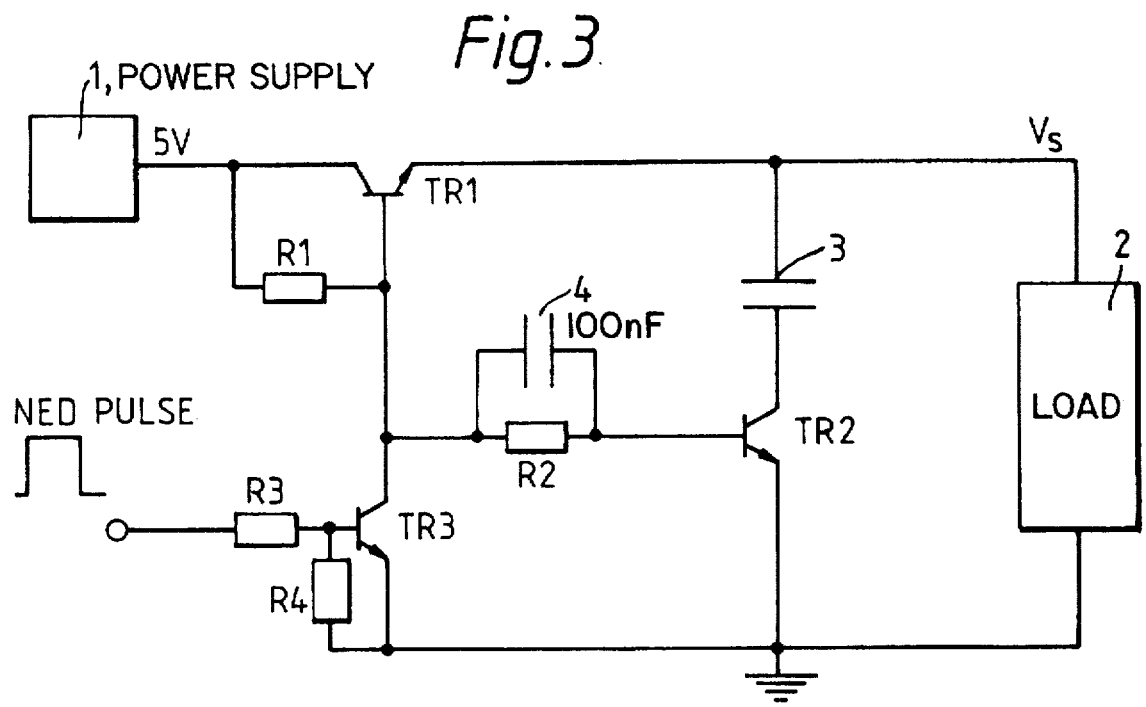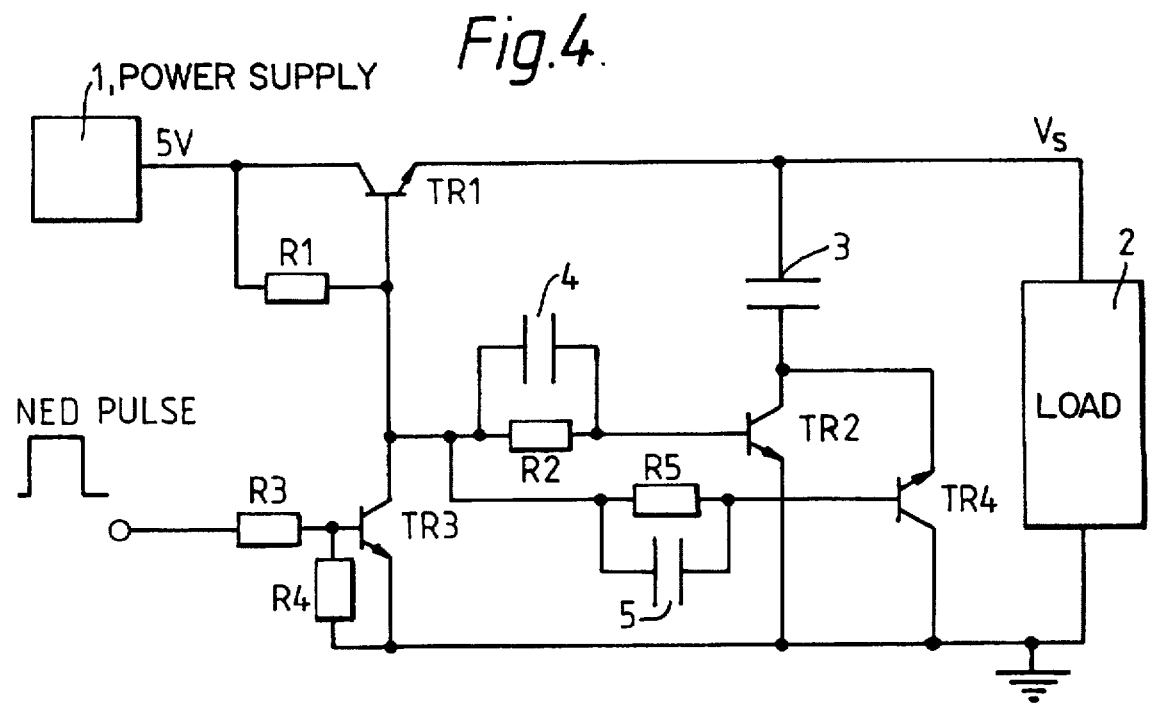

ELECTRONIC SWITCHING CIRCUITS

FIELD OF THE INVENTION

This invention relates to electronic switching circuits which are particularly suitable for protecting electronic components from the harmful effects of ionising radiation.

BACKGROUND OF THE INVENTION

It is known that exploding nuclear weapons produce pulses of ionising radiation (X and γ rays). Electronic components irradiated as a result can suffer damage. Such radiation has the effect of producing excess electron-hole pairs within semi-conductor P-N junctions. These electron-hole pairs result in photocurrents which flow across the junctions. A large enough photocurrent can cause "latch up" of logic elements, i.e. the outputs from integrated circuits fix themselves at some voltage level rendering the circuit unable to fulfil its intended purpose. In some circumstances, the photocurrents may be large enough to cause burn-out of components.

Known ways of minimizing the effects of the harmful radiation involve, for example, the use of nuclear event detectors coupled to one of several forms of a protection circuit. Some of these methods are reviewed in EDN. Aug. 22 1985 pp 133–140.

In some circumstances, components can be protected from high photocurrent burn-out by incorporating current limiting resistors which control the components' power dissipation. This method is not always appropriate however, particularly for those components which have a latch hold current which is less than their normal operating current.

Known nuclear event detectors (NED) sense a pulse of ionizing radiation and themselves generate an electrical pulse of pre-set duration which activates, for example, a power supply crowbar circuit. (Naturally, the NED and crowbar circuit need to be radiation-proof to a certain degree). The aforementioned reference at page 137 illustrates a crowbar circuit. Circuits of this type can remove the power from the electronic components under threat within 10 to 100 milliseconds.

When the components have recovered, the power can be re-applied. Recovery time depends upon the intensity of the radiation pulse and the type of components under consideration. After the crowbar circuit allows re-application of the power, an appreciable amount of time may elapse before the electronic components are functioning properly again. This time delay is due, mainly, to the time taken by decoupling capacitors to recharge. (These capacitors also take a finite time to discharge, of course, following removal of the power).

Each integrated circuit comprising an electronic system normally has associated with it a decoupling capacitor (typically 0.1 µF) connected across the power rails, one purpose being to prevent any voltage spikes present on the power lines from interfering with the integrated circuits' normal operation.

Consider the case where the electronic system in question forms part of a guidance control circuit for a missile which is flying at great speed. During the time between the onset of "latch-up" due to irradiation and re-establishment of full voltage to the integrated circuits, the missile will be out of control. If this time interval is too long, the situation cannot be remedied even though all integrated circuits may be functioning correctly after power-up.

SUMMARY OF THE INVENTION

Thus there is a need to further reduce the time between latch-up and re-application of the power supply.

The object of this invention is to provide a radiation protection circuit which allows re-establishment of normal working conditions in a very short time. Thus, in the missile case, the time interval for which the missile is out of control is significantly reduced.

The invention consists of a switching circuit for connection between an electronic component and a power supply, the circuit comprising a decoupling capacitor for connection across power supply inputs to the electronic component and first and second switches for isolating the electronic component and the decoupling capacitor from the power supply.

Under normal operating conditions, both switches are closed, thereby allowing the electronic component to receive power from the supply and allowing the decoupling capacitor to bridge the power rails and thus perform its usual function.

Opening of the switches can be initiated by an output from an NED circuit connected to the protection circuit. By virtue of the second switch, the decoupling capacitor retains its charge whilst the power supply to the electronic component is interrupted. Thus, when the NED signals closure of the switches again in order to resume normal operation, there is no time delay during which the decoupling capacitor has to recharge. Thus, the time interval between power-down and power-up is minimized.

Preferably, the first and second switches comprise first and second NPN transistors. Their switching may be controlled by a third NPN transistor. This in turn may be switched on by an pulse from an NED circuit.

The choice of NPN rather than PNP transistors has the advantage of a simpler circuit design. As will be evident from consideration of the circuit descriptions to follow, photocurrents induced in the third transistor following a nuclear event assist the desired effect of turning it on. Photocurrents induced in the first transistor flow harmlessly to earth by virtue of the action of the third transistor. Photocurrents induced in the second transistor are only likely to reduce the performance of the circuit where the electronic component in question has an exceptionally low latch-up current, i.e., less than its normal operating current. In such cases, the invention provides a solution to this problem, to be described below.

Hence the circuit can be made inherently radiation-proof.

The protection circuit comprising the above-mentioned first, second and third transistors can function satisfactorily without triggering from an NED circuit and can allow normal operation once the radiation drops to an ineffectively low level. However, incorporating an NED circuit is preferable as it has the advantage of a variable output pulse length, i.e. the time for which the power can be held off can be controlled.

It will be appreciated that because the decoupling capacitor does not lose its charge during power-off, its value will have no bearing on the time taken to re-establish normal operation after power is re-applied. Therefore, the decoupling capacitor could have any realistic value from say 0.01 µF to a few hundred µF.

Optionally, a fourth transistor arranged in parallel with the second may be incorporated into the protection circuit to allow (alternating) current to flow either way through the decoupling capacitor. This has the advantage of allowing the capacitor to decouple unwanted signals more efficiently.

Optionally, further capacitors may be incorporated into the protection circuit in order to sink any unwanted currents flowing across the second and fourth transistors during power-off. These unwanted currents would otherwise tend to discharge the decoupling capacitor and supply current to the electronic component. Alternatively, or additionally, these unwanted currents may be diverted by incorporating a low impedance path located in parallel with the decoupling capacitor and across the power rails. Preferably, the low impedance path is realised by a resistor and a further NPN transistor in series. This transistor may be connected so as to be radiation tolerant itself, switching on when a nuclear event occurs.

These circuits (incorporating further capacitors and/or low impedance path) are particularly suitable for use with electronic components having exceptionally low latch hold currents which are less than normal operating currents.

The option of providing the low impedance path is particularly advantageous when incorporated with the circuit incorporating the fourth transistor.

BRIEF DESCRIPTION OF THE DRAWINGS

Some embodiments of the invention will now be described, by way of example only, with reference to the drawings of which:

FIGS. 2 to 5 are circuit diagrams of alternative embodiments of the invention.

In FIG. 1 a power supply 1 is connected to an electronic component (LOAD) 2 via a switch S1. Across the component 2 and between the power rails ($V_s$ and ground) is connected a decoupling capacitor 3 and a switch S2.

DESCRIPTION OF THE PREFERRED EMBODIMENT

During normal operating conditions both switches are closed. Thus, power is supplied to the component and the decoupling capacitor effectively prevents any interference present on either power rail ($V_s$ or ground) from reaching the component 2. Assume in this example that the supply voltage is 5V, i.e. a 5V potential difference exists across the capacitor 3 when switch S2 is closed.

When a nuclear event occurs, the switches S1 and S2 will be opened (by external circuitry to be described below). Thus, power will be removed from the component 2 but there will still be a 5V potential difference maintained across the capacitor 3, with its point of connection to the power rail $V_s$ being at 0V (Point A in FIG. 1) and its point of connection to the open switch S2 (point B in FIG. 1) being at -5V. As there is no current path for the capacitor to discharge through, it remains charged for the entire power-off period. When the switches S1 and S2 close again, normal operation of the component 2 can resume immediately without any time delay during which the decoupling capacitor needs to recharge.

Figure 1:
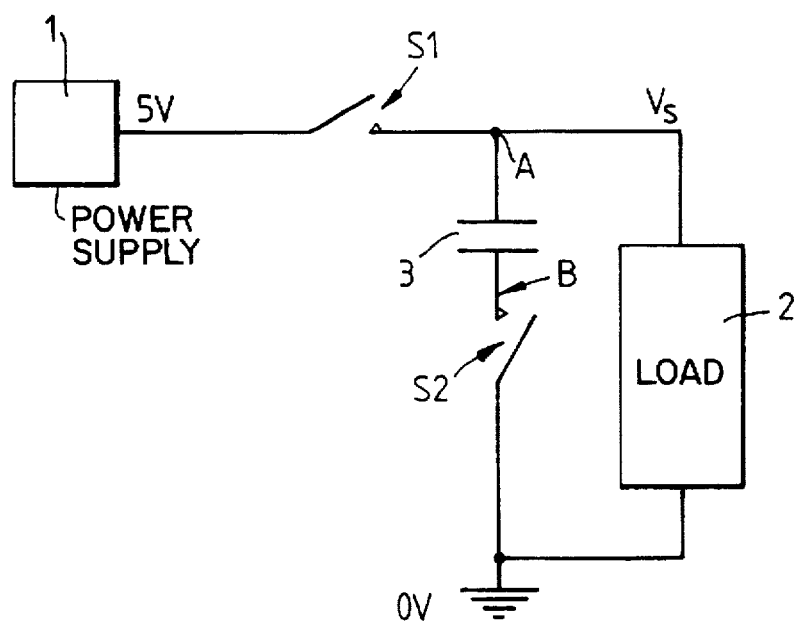
FIG. 1 is a circuit diagram illustrating the principle of the invention.
Figure 2:
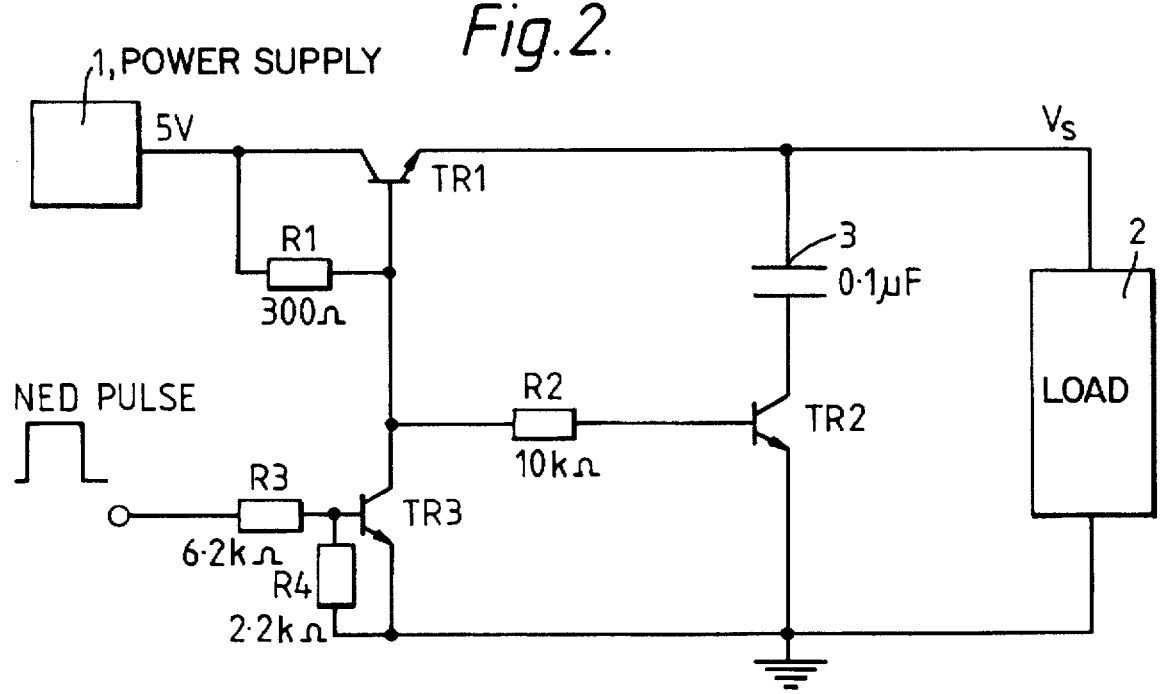

In FIG. 2, the switches S1 and S2 of FIG. 1 are been realized as NPN transistors TR1 and TR2 respectively. Each transistor has an associated bias resistor R1 and R2 respectively. TR1 needs to be a high power device as it needs to supply operational current to the electronic component 2.

A third transistor TR3 and its associated bias resistors R3 and R4 serves to control the switching of the transistors TR1 and TR2. The transistor TR3 is in turn controlled by an output pulse from an NED (not shown). The NED can comprise any suitable form of nuclear event detecting circuitry. As such circuits are known, it will not be described herein.

The decoupling capacitor 3 may have a value of 0.1 μF, and resistor values are typically as shown in FIG. 2.

The protection circuit of FIG. 2 is configured to disconnect power from the component 2 on a positive going pulse from an NED, the pulse being applied to the base of the transistor TR3.

In operation, and under normal conditions the transistors TR1 and TR2 are on and conducting and the transistor TR3 is off. Following a nuclear event, a positive-going pulse is applied to the base of the transistor TR3. This pulse has the effect of turning TR3 on. As a result of TR3 switching on and drawing current from the power supply 1, the transistors TR1 and TR2 switch off. Hence the current supply to the component 2 is interrupted but current may still be drawn by transistor TR3 via resistor R1. As explained, with reference to FIG. 1, the decoupling capacitor still remains charged with the collector of transistor TR2 being held at -5V.

Any photocurrents which are induced in transistor TR3 assist in holding TR3 on. Photocurrents induced in TR1 flow harmlessly to ground. Photocurrents induced in TR2 flow onto the capacitor 3 and through the electronic component 2. These latter photocurrents are only a problem to components having very low latch hold currents. In such cases, solutions to the problem are described with reference to FIGS. 3 and 5.

When the pulse from the NED drops to zero, transistor TR3 will turn off again, thus allowing transistors TR1 and TR2 to conduct, thus re-applying power to the component 2.

During power off, there are two mechanisms by which reverse current can flow across transistor TR2. The first mechanism is attributable to induced photocurrents (as already discussed). A second is a result of the potential difference across R2 supplying current to the base of TR2 which has a bias across it (of -5V at the collector and 0V at the emitter). Unless these currents are soaked away by some means, their effect will be to tend to reduce the voltage held by the decoupling capacitor 3 and to supply current to the component 2. This is undesirable as it is preferable for the capacitor to retain its full charge so that no time is lost in recharging after the power is re-connected to the component 2. Also, the current supplied to the component could sustain latch-up.

In FIG. 3 a means for sinking this reverse current is illustrated. FIG. 3 shows essentially the same circuit as in FIG. 2 with the addition of a capacitor 4 placed in parallel across resistor R2. This capacitor 4 accumulates charge during power-off, i.e. it soaks up any photocurrent flowing from the emitter to base of transistor TR2. A typical value for capacitor 4 could be 100 nF.

The capacitor 4 also absorbs current flowing through R2 as a result of the potential difference across this resistor, thus sustaining the voltage at the base of TR2 during power-off.

From consideration of FIGS. 2 and 3 it can be seen that the presence of the transistor TR2 could diminish the efficiency with which the decoupling capacitor 3 is able to prevent unwanted voltage spikes (for example) from reaching the component 2. This is because the transistor TR2 when conducting, tends to prevent current flow from ground to the capacitor 3. FIG. 4 shows a modified circuit in which this problem is resolved.

In FIG. 4 a fourth NPN transistor TR4, biased by a resistor R5 has its collector connected to ground and its emitter connected to the capacitor 3 such that under normal conditions transistor TR4 provides a current path from ground to the decoupling capacitor 3, i.e. during normal operation, transistor TR4 is switched on. When an NED pulse appears on the base of transistor TR3, transistor TR4 will switch off under the action of transistor TR3.

The problem of forward currents tending to flow across transistor TR4 during power-down and thereby tending to diminish the voltage across the capacitor 3 can be solved in a similar way as previously described with reference to FIG. 3. Specifically, this is done by placing a capacitor 5 across the resistor R5. Thus, the capacitors 4 and 5 tend to soak up unwanted currents flowing through transistors TR2 and TR4 respectively whilst the power is off.

Figure 5:
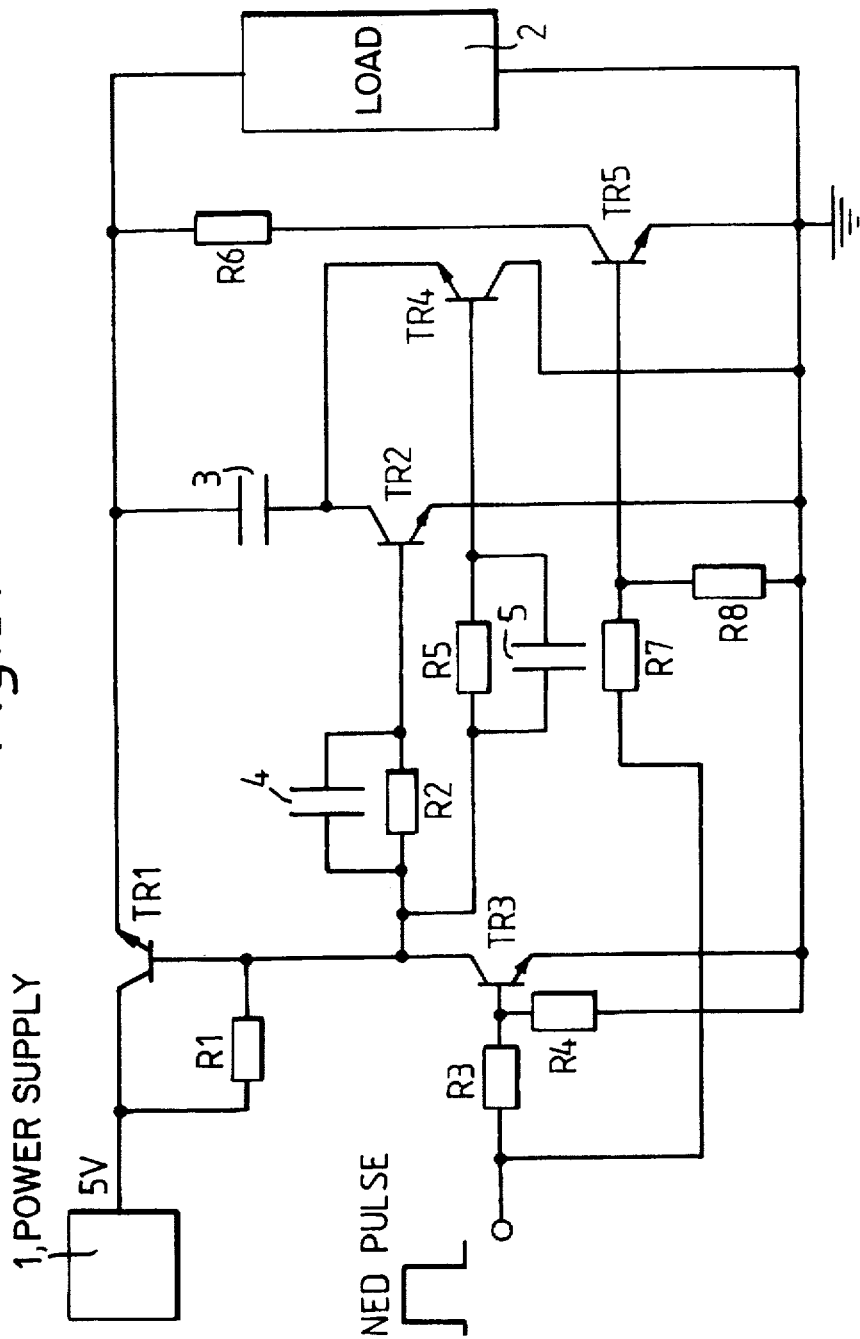

An alternative solution for dealing with unwanted currents is shown in the embodiment of FIG. 5. This solution is especially suitable for the low latch hold current case and also where a fourth transistor is incorporated (as in the embodiment of FIG. 4). It involves the provision of a low impedance path across the decoupling capacitor 3 from the power rail Vs to ground. This path takes the form of a resistor R6 in series with an NPN transistor TR5. With reference to FIGS. 2, 3 and 4 it was explained that undesirable currents can leak across the transistors TR2 and TR4. In the case of TR4, the currents are more significant because the flow is in the forward direction, thus being subjected to the full forward gain of the transistor. These currents are composed of induced photocurrents and the current flowing through resistor R5 due to the potential difference across it. In the FIGS. 3 and 4 embodiments, the currents are absorbed by the capacitors 4 and 5. In FIG. 5 an alternative (or additional) solution is provided. Normally, the transistor TR5 is off but switches on when a pulse is generated by the NED. This is achieved by connecting the base of the transistor TR5 to the output of the NED via a potential divider R7 and R8. Thus, current may flow from the power rail $V_s$ to ground (during power-off) through the resistor R6 and transistor TR5. This way, any leakage current which would otherwise flow through the component (and possibly cause latch-up) is diverted through the low impedance path comprising resistor R6 and transistor TR5. In effect, the transistor TR5 switches the resistor R6 in and out of the circuit as appropriate.

Although the above embodiments are configured as radiation protection circuits, the invention is by no means limited to this sole application. The invention can have uses in any system where a fast switching circuit is required.

I claim:

1. A switching circuit for connection between an electronic component having first and second input terminals and a power supply, said switching circuit comprising:

a decoupling capacitor for connection across said first and second input terminals of said electronic component; and first and second switches for isolating electrically said electronic component and said decoupling capacitor from said power supply, said first switch providing a connection between said first terminal of said electronic component and said power supply, and said second switch providing a connection between said second terminal of said electronic component and said decoupling capacitor.

2. A switching circuit for connection between an electronic component having first and second input terminals and a power supply, said switching circuit comprising:

a decoupling capacitor for connection across said first and second input terminals of said electronic component; and first and second NPN transistors for isolating electrically said electronic component and said decoupling capacitor from said power supply, said first NPN transistor providing a connection between said first terminal of said electronic component and said power supply, and said second NPN transistor providing a connection between said second terminal of said electronic component and said decoupling capacitor.

3. A switching circuit as claimed in claim 2, said switching circuit further comprising a third NPN transistor connected with said first and second NPN transistors for controlling switching of said first and second NPN transistors.

4. A switching circuit as claimed in claim 3, said switching circuit further comprising a fourth NPN transistor connected in parallel with said second NPN transistor.

5. A switching circuit as claimed in claim 3, said switching circuit further comprising a first capacitor connected to said second NPN transistor for sinking unwanted reverse currents flowing in said second NPN transistor.

6. A switching circuit as claimed in claim 4, said switching circuit further comprising a first capacitor connected to said second NPN transistor for sinking unwanted reverse currents flowing in said second NPN transistor.

7. A switching circuit as claimed in claim 4, said switching circuit further comprising a second capacitor connected to said fourth NPN transistor for sinking unwanted currents flowing in said fourth NPN transistor.

8. A switching circuit as claimed in claim 6, said switching circuit further comprising a second capacitor connected to said fourth NPN transistor for sinking unwanted currents flowing in said fourth NPN transistor.

9. A switching circuit as claimed in claim 3, said switching circuit further comprising a low impedance path located in parallel with said decoupling capacitor.

10. A switching circuit as claimed in claim 4, said switching circuit further comprising a low impedance path located in parallel with said decoupling capacitor.

11. A switching circuit as claimed in claim 5, said switching circuit further comprising a low impedance path located in parallel with said decoupling capacitor.

12. A switching circuit as claimed in claim 6, said switching circuit further comprising a low impedance path located in parallel with said decoupling capacitor.

13. A switching circuit as claimed in claim 7, said switching circuit further comprising a low impedance path located in parallel with said decoupling capacitor.

14. A switching circuit as claimed in claim 8, said switching circuit further comprising a low impedance path located in parallel with said decoupling capacitor.

15. A switching circuit as claimed in claim 9, wherein said low impedance path comprises a resistor connected in series with a fifth NPN transistor.

16. A switching circuit as claimed in claim 10, wherein said low impedance path comprises a resistor connected in series with a fifth NPN transistor.

17. A switching circuit as claimed in claim 11, wherein said low impedance path comprises a resistor connected in series with a fifth NPN transistor.

18. A switching circuit as claimed in claim 12, wherein said low impedance path comprises a resistor connected in series with a fifth NPN transistor.

19. A switching circuit as claimed in claim 13, wherein said low impedance path comprises a resistor connected in series with a fifth NPN transistor.

20. A switching circuit as claimed in claim 14, wherein said low impedance path comprises a resistor connected in series with a fifth NPN transistor.

21. A switching circuit for connection between an electronic component having first and second input terminals and a power supply, said switching circuit comprising:
   a first capacitor for connection across said first and second input terminals of said electronic component; and
   first and second transistors for isolating electrically said electronic component and said first capacitor from said power supply, said first transistor providing a connection between said first terminal of said electronic component and said power supply, and said second transistor providing a connection between said second terminal of said electronic component and said first capacitor.

22. A switching circuit as claimed in claim 21, said switching circuit further comprising a third transistor connected with said first and second transistors, said third transistor controlling switching of said first and second transistors.

23. A switching circuit as claimed in claim 22, said switching circuit further comprising a fourth transistor connected in parallel with said second transistor.

24. A switching circuit as claimed in claim 22, said switching circuit further comprising a second capacitor connected to said second transistor.

25. A switching circuit as claimed in claim 24, said switching circuit further comprising a third capacitor connected to said fourth transistor.

26. A switching circuit as claimed in claim 22, said switching circuit further comprising a low impedance path located in parallel with said first capacitor.

27. A switching circuit as claimed in claim 26, wherein said low impedance path comprises a resistor connected in series with a fifth transistor.

* * * * *